Patented Aug. 14, 1945

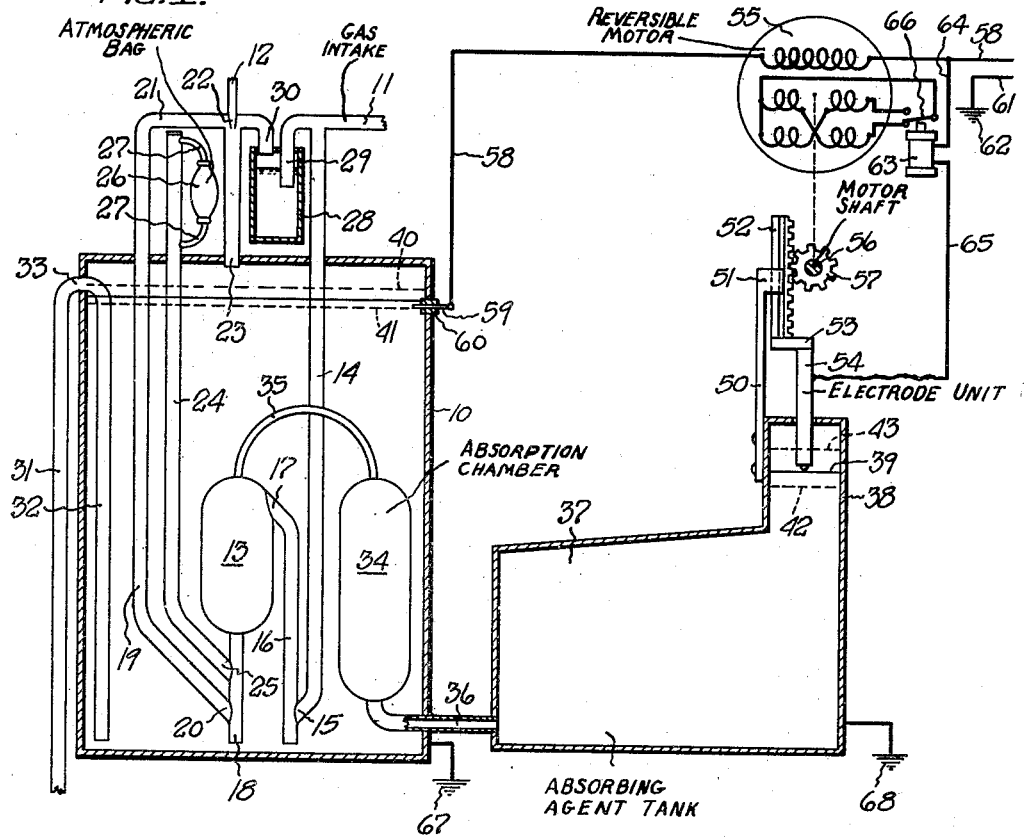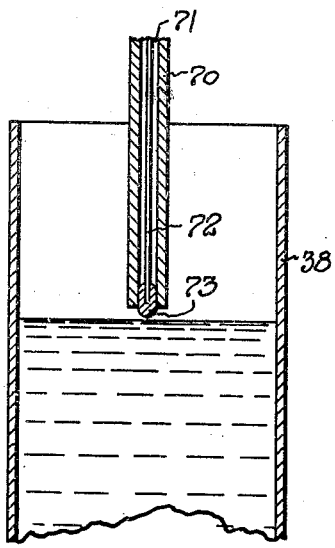

2,382,516

UNITED STATES PATENT OFFICE 2,382,516

LIQUID LEVEL FOLLOW-UP DEVICE

Philip T. Sprague, Long Beach, Ind., assignor to The Hays Corporation, Michigan City, Ind., a corporation of Indiana Application March 29, 1943, Serial No. 480,971

5 Claims. (Cl. 200—152)

This invention relates to improvements in liquid level follow-up devices, and more particularly to electrode means utilized to make and break electrical contact with a conducting liquid in such devices.

The calibration and the accuracy of the recording, indicating or control functions of a liquid level follow-up device of the electrical type which includes a feeler or electrode reciprocable to make and break a circuit with a body of conducting liquid, and particularly an electrolyte, depends primarily upon the permanence of the feeler or electrode and its resistance to change incident to making and breaking of an electrical circuit at frequent intervals. Thus in the use of a device of this character, the frequent making and breaking of a circuit between a metallic electrode and an electrolyte produces electrolysis or electroplating, with incident changes in the dimension, such as the length of the electrode, which tend constantly to throw the device out of proper calibration. More particularly, where an electroplating action occurs in which the metal of the electrode plates off, the length of the electrodes is continually being shortened, with the result that the mechanism mounting the electrode must gradually lower the electrode more and more to effect contact with the liquid, even though the level of the liquid remains constant. It is customary to utilize some element associated directly or indirectly with the mounting for the electrode or with the means for raising and lowering the same, for the purpose of actuating or operating an indicator, recorder or controller, and therefore the change in position of the device at contacting position due to plating off acts to progressively destroy the accurate relation of parts necessary for true calibration. Another detrimental reaction in the nature of pitting or erosion due to arcing is also experienced in devices of this character.

The same result occurs where a graphite electrode is employed. The cause is different, and appears to involve a progressive breaking down of the binder of the graphite. Nevertheless, the detrimental effect of change in the length of the eletrode, i. e., shortening thereof, is encountered.

Therefore, it is the primary object of this invention to provide a device of this character wherein the electrode is constructed to maintain the calibration of the device substantially constant.

A further object is to provide a device of this character wherein contact between the electrode and a body of liquid is effected liquid-to-liquid.

A further object is to provide a device of this character wherein an electrode is mounted within a capillary tube to terminate adjacent the mouth of the tube, whereby the mouth of the tube will hold, by capillary action, a quantity of liquid sufficient to immerse the end of the electrode and assuming drop form projecting beyond the end of the tube for contact with a body of liquid without lowering the tube to the level of the liquid.

A further object is to provide a gas analyzer of the absorption or Orsat type provided with electrical liquid level responsive indicating or recording means juxtaposed to an absorbing agent.

A further object is to provide a liquid level follow-up device which is rendered operative only when the liquid level is in a predetermined limited range.

Other objects will be apparent from the description and appended claims.

In the drawing:

Fig. 1 is a schematic or diagrammatic view illustrating the application of my invention to a gas analyzer of the Orsat type.

Fig. 2 is an enlarged detail sectional view illustrating the construction of my new liquid level feeling device.

While the invention is susceptible of many uses, I have chosen to illustrate and describe it in connection with a gas analyzer of the automatic Orsat type.

One embodiment of such apparatus is illustrated in Fig. 1, wherein a standpipe 10 is connected at 12 with a source of water or other liquid, and at 11 with a source of the gas to be analyzed. Within the standpipe 10 is positioned a measuring burette 13 to which gas is supplied from source 11 by means of a vertical tube 14 branching from 11 and connected at 15, at a level below the bottom of burette 13, with a vertical tube 16, having an open lower end and a lateral portion 17 communicating with the upper end of burette 13. A vertical tube 18 depends from the bottom of burette 13 and is open at its lower end. Gas from burette 13 normally exhausts through a vertical tube 19 which branches from tube 18 at 20 at the same level as 15. Tube 19 extends through the top of standpipe 10 and has a lateral upper portion 21 into which water supply line 12 extends at 22. An aspirator tube 23 branches from lateral portion 21 in alignment with water supply line 12, whereby gas in lateral portion 21 is drawn through tube 23 and exhausted into the standpipe 10.

Another vertical tube 24 branches from tube 18 at 25 at a level above 15 and 20. The upper end of tube 24 extends above standpipe 10, and is closed. A flexible resilient atmospheric bag 26 is connected with the tube 24 by tubes 27 at its upper and lower ends, said bag being positioned externally of standpipe 10.

A sealed liquid container 28 is positioned above standpipe 10 and has a downwardly bent portion 29 of gas supply tube 11 projecting therein and terminating below the liquid level thereof. Also connected with the upper end of container 28 is a tube portion 30 bent from lateral portion 21.

A siphon 31 is connected with standpipe 10. One leg 32 of the siphon is positioned within the standpipe, and the bend 33 of the siphon passes through the wall of the standpipe adjacent to but spaced below the top of the standpipe. The lower end of siphon leg 32 preferably terminates above the bottom of standpipe 10 at approximately the same level as the lower ends of tubes 16 and 18.

An absorption chamber 34, preferably containing steel wool, etc., is positioned within the standpipe, with its top substantially at the same level as the top of burette 13. An inverted U-tube 35 connects the tops of burette 13 and chamber 34. A tube 36 communicates with the bottom of chamber 34 and extends laterally outwardly through standpipe 10 for communication with the lower end of a tank 37 containing a supply of an absorbing agent, such as caustic (KOH), in the event that the device is to measure the carbon dioxide ($CO_2$) content of a gas sample. Tank 37 preferably includes a body portion positioned below the level of the top of chamber 34, and has a restricted vertical chambered portion 38 extending above the level of chamber 34.

The operation of the analyzer can be described briefly as follows: A small stream of water passes through line 12 and aspirator tube 23, drawing gas from line 11 through tubes 14 and 16, burette 13, and tubes 18 and 19. The water gradually fills standpipe 10. As water rises in the standpipe, it first simultaneously closes communication between tubes 14 and 16 at 15, and between tubes 18 and 19 at 20, thereby trapping a quantity of gas in burette 13 and the communicating tubes. As the water continues to rise, it forces part of the trapped gas into the atmospheric bag 26 until communication between tubes 18 and 24 is closed thereby at 25, thus insuring the retention in burette 13 of an accurately measured quantity of gas at atmospheric pressure. Thereafter, continued rise in the level of water forces the gas sample from burette 13 through tube 35 and into absorption chamber 34 where the constituent, such as $CO_2$, to be measured is completely absorbed.

Some of the absorbing agent is forced from chamber 34 through tube 36 into tank 37, causing the level 39 to rise in portion 38 of said tank. The level to which the absorbing agent rises in tank portion 38 depends entirely on the amount of gas left in chamber 34 after the constituent under test ($CO_2$) has been absorbed.

During the absorbing operation, the water continues to rise in the standpipe until it reaches level 40, where the siphon 31 starts to operate to empty the standpipe, allowing the unabsorbed portion of the gas sample to be pushed back into the measuring burette and the level of the absorbing agent in tank 37 to return to normal. A fresh stream of gas then flows through the circuit to sweep out all residue of the previous sample, and the process is then repeated. During the period in which the flow of gas to the burette is stopped, the gas continuously supplied by line 11 is bubbled through the liquid in container 28 and discharged through tube portions 30 and 12 to aspirator tube 23 and the interior of the standpipe.

It has previously been customary in devices of this character, to obtain a reading of the amount of gas absorbed in each cycle by measurement of the pressure within tank portion 38 when the latter was sealed so that air would be compressed incident to rise in the level of the absorbing agent therein as above described. This method has certain limitations, inasmuch as the power available for actuating the recording or indicating mechanism is limited. I therefore propose to employ an electrically operated device of the liquid level follow-up type, to which ample power for any purpose, i. e., indicating, recording or controlling, may be supplied, and which can be calibrated accurately because of the relation existing between the gas absorbing operation and the level to which liquid rises in tank 37 incident to said absorbing operation.

For purposes of illustration, one form of liquid level follow-up device is shown in Fig. 1. A standard 50 is carried by tank portion 38 and terminates in a laterally off-set guide portion 51. Portion 51 mounts a rack 52 for guided vertical reciprocation. Rack 52 terminates in spaced relation above tank portion 38 and carries an insulation member 53 at its lower end. An electrode unit 54 depends from insulation member 53 and extends into tank portion 38. A reversible electric motor 55 has a shaft 56, on which is mounted a pinion 57 which meshes with rack 52. Motor 55 is interposed in a line 58 with which an electrode 59 mounted in a side wall of standpipe 10 by means of an insulation sleeve 60 is connected. Electrode 59 is positioned to be engaged by water within the standpipe when the latter reaches level 41. The other line 61 of the motor circuit is grounded at 62.

A spring pressed relay 63 is connected by line 64 with line 58, and by line 65 with electrode unit 54. The relay includes a two position switch 66 by means of which the reversing coils of the motor 55 are controlled. Standpipe 10 is connected to ground at 67, and tank 37 is connected to ground at 68. Indicating, recording or controlling means (not shown) may be connected with the system in any manner desired, for example, for operation by the shaft 56.

The operation of the liquid level follow-up device may be described as follows: Inasmuch as the operation of an indicator or recorder is necessary only during the interval when absorption of the constituent under test from the measured gas sample occurs, the follow-up device is inoperative until the liquid in standpipe 10 rises to a level to contact electrode 59, thereby closing the motor circuit from line 58 through electrode 59, the liquid in the standpipe, the walls of the standpipe, grounds 67 and 62 to line 61. At the time liquid in the standpipe reaches level 41, the absorbing agent in tank portion 38 will be approximately at level 42. Since operation of the motor 55 in the preceding cycle was discontinued when the level of liquid in tank 38 was high, say approximately at level 43, the electrode unit 54 is above level 42 when motor 55 starts and the coil of relay 63 is deenergized, so motor 55 will operate shaft 56 in a direction to lower rack 52 and electrode unit 54 until the latter makes electrical contact with the liquid in tank portion 38 to close the relay circuit through lines 58, 64, the relay coil, line 65, electrode unit 54, the liquid in tank 37, and grounds 68 and 62 to line 61. This energizes the relay coil and actuates reversing switch 66 to reverse the direction of rotation of motor 55 and thereby raise or elevate rack 52 and electrode unit 54, until the relay circuit is broken. During the remainder of the absorbing operation, i. e., until the standpipe is drained by the siphon from level 40 to and below level 41, the relay circuit is alternately opened and closed to cause the electrode unit 54 to follow accurately all changes in the level of the liquid within tank portion 38, i. e., approximately from level 42 to uppermost level 43. It will be apparent also that electrode 59 may be mounted in tank portion 38, if desired.

It will be apparent from the above that the accuracy of the device, and particularly its proper calibration, depends upon the electrode. The gas absorbing agent in tank 37 is usually an electrolyte, whereby the use therewith of an ordinary electrode, such as a metal rod or bar, presents difficulties as outlined above. To overcome these difficulties, I prefer to utilize an electrode unit of the character illustrated in Fig. 2. Thus I utilize a member 70, preferably formed of a non-conductor such as a plastic material, for example "Lucite," which has a capillary bore 71 therein open at its bottom or lower end. Within this bore 71 a metal rod or bar 72 of a diameter less than the bore is mounted in such a position that it terminates adjacent to but spaced slightly inwardly from or above the mouth of the bore. Any suitable mounting for properly positioning the rod 72 may be employed.

In the use of an electrode unit 54 of this type, it will be apparent that upon first use, i. e., first immersion of the end of member 70 into the electrolyte (gas absorbing agent), a small quantity of the electrolyte 73 will enter the lower end of bore 71, contacting and encircling the end of rod 72. Then, when the electrode unit is removed from the electrolyte, the electrolyte portion 73 within the bore will, by capillary action, remain in said bore. Some of the electrolyte portion 73 will project below the plane of the lower end of member 70. Consequently, each subsequent circuit-closing operation of the electrode unit effects a liquid-to-liquid electrical contact. This avoids the deleterious effects upon the metal element normally caused by arcing. Also, if an electroplating or other eroding action upon rod 72 occurs to such an extent that drop 73 does not have a good electrical contact with rod 72, the rod 72 may be repositioned in the bore 71 to reestablish good electrical contact. Note, however, that electroplating or erosion of rod 72 does not change the calibration of the device, since the position of the drop 73 in the mouth of the bore 71 remains substantially constant, and liquid-to-liquid contact is always effected at the same position of the member 70. Consequently, as long as the follow-up device continues to operate, its calibration at the electrode unit is accurate.

I claim:

1. In an electrical follow-up device responsive to changes in a liquid level, an electrode unit comprising a vertical tubular non-conducting member having a capillary bore adapted to receive and retain a small quantity of liquid at its lower end, and an electrode in said member terminating within said liquid and above the level of the lower end of said member.

2. In an electrical follow-up device responsive to changes in a liquid level, an electrode unit adapted to be reciprocated vertically to open and close an electrical circuit through said liquid and comprising a vertical non-conductor having a capillary bore, and a conductor within said bore terminating adjacent and within the mouth of said bore, said bore being adapted to retain a small quantity of liquid at its mouth immersing the end of said conductor.

3. In an electrical liquid level follow-up device, an electrode unit comprising a non-conductor adapted to be reciprocated vertically and having an upwardly extending capillary bore open at the bottom face thereof, said bore being adapted to retain a small quantity of liquid therein at its lower end, and a conductor carried by said non-conductor and in electrical contact at its lower end portion with the liquid retained in the lower end of said bore.

4. In an electrical liquid level follow-up device, an electrode unit comprising an elongated vertical non-conducting plastic member having a longitudinal capillary bore open at its lower end and adapted to receive and retain a small quantity of liquid in its mouth, and a conductor carried by said member and contacted at its lower end by the liquid retained in said bore.

5. An electrode unit comprising a non-conductor having a substantially vertical bore open at its bottom face and in which a small quantity of liquid is retained by capillarity, and a conductor carried by and positioned above the bottom of said non-conductor in electric-contact-maintaining relation to the liquid retained in said bore.

PHILIP T. SPRAGUE.